United States Patent
Funato

(10) Patent No.: US 12,049,939 B2
(45) Date of Patent: Jul. 30, 2024

(54) IMPACT ABSORBING BODY

(71) Applicant: KYORAKU CO., LTD., Kyoto (JP)

(72) Inventor: Takafumi Funato, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 360 days.

(21) Appl. No.: 17/604,812

(22) PCT Filed: May 27, 2020

(86) PCT No.: PCT/JP2020/020854
§ 371 (c)(1),
(2) Date: Oct. 19, 2021

(87) PCT Pub. No.: WO2020/241666
PCT Pub. Date: Dec. 3, 2020

(65) Prior Publication Data
US 2022/0205506 A1    Jun. 30, 2022

(30) Foreign Application Priority Data

May 31, 2019  (JP) ................................ 2019-101921

(51) Int. Cl.
*F16F 7/12*      (2006.01)
*B60R 21/00*     (2006.01)
*B60R 21/045*    (2006.01)

(52) U.S. Cl.
CPC ............... *F16F 7/12* (2013.01); *F16F 7/123* (2013.01); *B60R 2021/0051* (2013.01);
(Continued)

(58) Field of Classification Search
CPC .... F16F 7/12; F16F 7/121; F16F 7/122; F16F 7/123; F16F 2236/04; B60R 21/04
See application file for complete search history.

(56) References Cited

U.S. PATENT DOCUMENTS 9,834,160 B2 * 12/2017 Staines .................. B60R 19/34
9,855,970 B2 *  1/2018 Kitakata .............. B62D 25/082
(Continued)

FOREIGN PATENT DOCUMENTS

CN        106809152 A    6/2017
JP        2006-130936 A  5/2006
(Continued)

OTHER PUBLICATIONS

International Search Report issued on Jul. 7, 2020 in corresponding International application No. PCT/JP2020/020854; 4 pages.
(Continued)

*Primary Examiner* — Nicholas J Lane
(74) *Attorney, Agent, or Firm* — Maier & Maier, PLLC

(57) ABSTRACT

A shock absorber capable of suppressing load fluctuation after the start of plastic deformation. The shock absorber formed of a hollow molded body, including a load input surface; a fixed surface opposed to the load input surface; and a connection surface connecting the load input surface and the fixed surface. The connection surface includes at least one transverse groove rib, the at least one transverse groove rib includes at least two bending induction portions provided at positions where distances from the load input surface are different from each other, the at least two bending induction portions each being convex toward an outside of the shock absorber.

7 Claims, 7 Drawing Sheets

(52) U.S. Cl.
CPC ....... *B60R 21/045* (2013.01); *F16F 2228/001* (2013.01); *F16F 2236/04* (2013.01)

(56) References Cited

U.S. PATENT DOCUMENTS

| | | | |
|---|---|---|---|
| 10,351,088 B2 * | 7/2019 | Tani | B60R 21/045 |
| 2009/0288923 A1 * | 11/2009 | Hwang | B60G 11/54 |
| | | | 188/268 |
| 2011/0133380 A1 * | 6/2011 | Harden | B60G 11/52 |
| | | | 267/292 |
| 2013/0300138 A1 * | 11/2013 | Banasiak | B60R 19/34 |
| | | | 293/133 |
| 2014/0048367 A1 * | 2/2014 | Tani | F16F 7/12 |
| | | | 188/377 |
| 2015/0061322 A1 * | 3/2015 | Tamada | B60R 19/34 |
| | | | 296/187.05 |
| 2016/0082913 A1 | 3/2016 | Tamada et al. | |
| 2016/0339859 A1 | 11/2016 | Marur et al. | |
| 2017/0151921 A1 | 6/2017 | Staines et al. | |

FOREIGN PATENT DOCUMENTS

| | | | |
|---|---|---|---|
| JP | 2013-217414 | A | 10/2013 |
| JP | 2015-214067 | A | 12/2015 |
| WO | 2014/156522 | A1 | 10/2014 |

OTHER PUBLICATIONS

Office Action issued on Feb. 24, 2024, in corresponding Chinese Application No. 202080029723.8, 19 pages.

* cited by examiner

IMPACT ABSORBING BODY

FIELD

The present invention relates to a shock absorber formed of a hollow molded body, and particularly to a shock absorber suitable for a knee bolster, a bumper absorber, and the like.

BACKGROUND

In vehicles, such as automobiles, a shock absorber is installed in an installation space between interior components, which are likely to come into contact with an occupant in the event of a collision, and body components, such as various panels that form a part of the body, which are located on an opposite side (back side) of the interior components from a cabin side. This shock absorber mitigates the impact on the occupant when the occupant comes into contact with the interior components in the event of a collision, to protect the occupant. A knee bolster is one example of this type of shock absorber.

Bumper structures have also been designed to reduce the load applied to the legs of pedestrians in bodily injury accidents, thereby reducing the damage to pedestrians. A bumper absorber is one example of the shock absorber used in such bumper structures.

For example, the knee bolster is installed in front of the knees of an occupant sitting in the front seat of a vehicle and has the function of protecting the occupant's knees by plastic deformation of the knee bolster in the event of a head-on collision of the vehicle. Patent Literature 1 discloses a hollow shock absorber formed of a blow-molded body that can be applied to a knee bolster.

PATENT LITERATURE

[Patent Literature 1] JP-A-2006-130936

SUMMARY

In the preferable relationship between the load and deformation of the shock absorber, the load (force) remains almost constant for a long period of time with respect to the amount of deformation after the start of plastic deformation, as shown in the "ideal state" in FIG. 2.

FIG. 2 shows a waveform of the relationship between the amount of deformation of the shock absorber (such as a knee bolster) and the load (force). In the ideal state of the shock absorber, the load fluctuation is almost constant after the start of the plastic deformation. In contrast, in the deformation-load characteristics in the prior art, such as Patent Literature 1, while the load received by the shock absorber gradually increases with the amount of deformation until the load on the shock absorber reaches Lmax, which is the limit of elastic deformation (elastic limit), the plastic deformation occurs rapidly in the entire shock absorber when the amount of deformation exceeds the elastic limit Lmax, so that the load becomes small Therefore, when a knee bolster is used as the shock absorber, a very large impact force is applied to the knee at the elastic limit Lmax. Further, the total amount of impact energy absorbed, which is the area integral value of the deformation-load characteristics, becomes small The present invention has been made in view of such circumstances, and an object is to provide a shock absorber capable of suppressing load fluctuation after the start of plastic deformation.

According to the present invention, provided is a shock absorber formed of a hollow molded body, comprising: a load input surface; a fixed surface opposed to the load input surface; and a connection surface connecting the load input surface and the fixed surface, wherein the connection surface comprises at least one transverse groove rib, the at least one transverse groove rib comprises at least two bending induction portions provided at positions where distances from the load input surface are different from each other, the at least two bending induction portions each being convex toward an outside of the shock absorber.

The shock absorber of the present invention includes a transverse groove rib, and the transverse groove rib has a bending induction portion. Since a plurality of bending induction portions provided for the shock absorber as a whole reach the elastic limit in sequence at different times as the shock absorber is deformed, it is advantageous that the load fluctuation after the start of plastic deformation can be suppressed in the shock absorber as a whole.

DETAILED DESCRIPTION

Hereinafter, the embodiments of the present invention will be described with reference to the drawings. The characteristic matters shown in the embodiments described below can be combined with each other. Moreover, each characteristic matter independently constitutes an invention.

<Example of Mounting Shock Absorber 1 as Knee Bolster>

Figure 3:
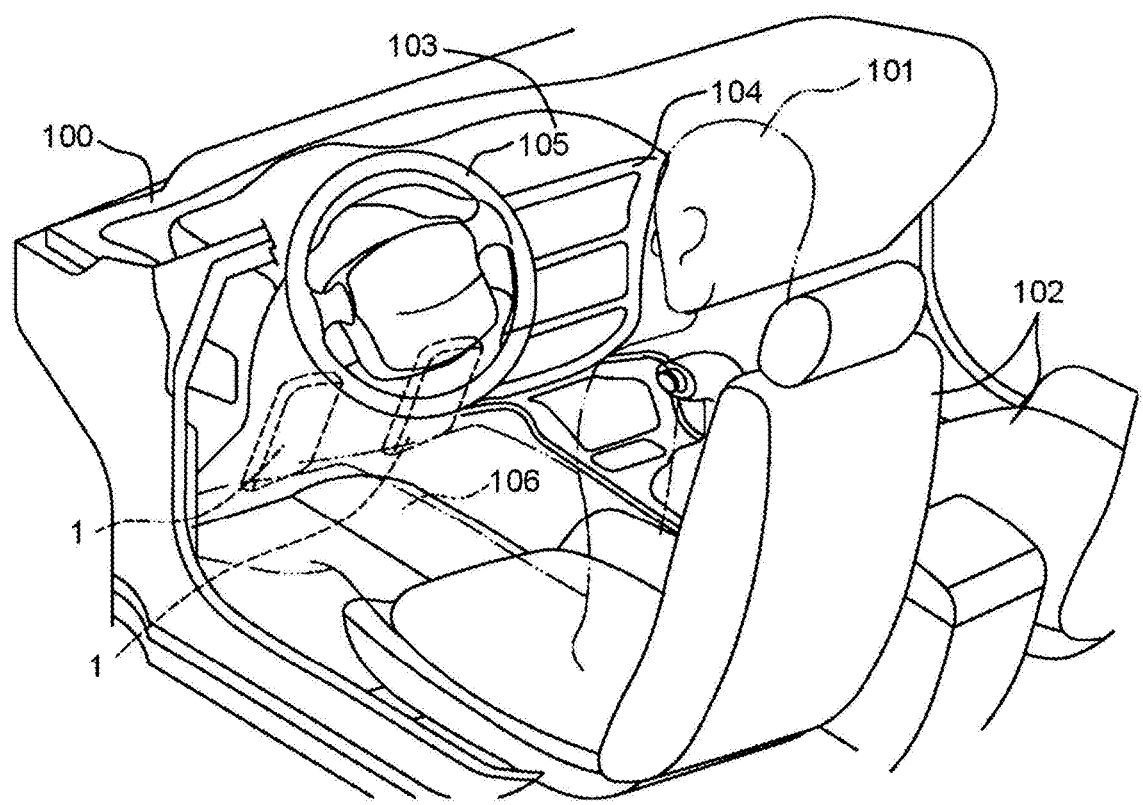
FIG. 3 shows an example where the shock absorber 1 is mounted as a knee bolster on an automobile.

First, referring to FIG. 3, an example in which a shock absorber 1 of the present embodiment is mounted as a knee bolster on an automobile will be described. FIG. 3 shows a state where the shock absorber 1 described later is mounted as a knee bolster on an automobile 100.

The automobile 100 shown in FIG. 3 has a passenger compartment 103 with a front seat 102 for an occupant including a driver 101, and a meter 104 is located on the side of a steering wheel 105. The steering wheel 105 is connected to a steering column (not shown), and a steering support member supporting the steering column is supported by an inner wall of a vehicle body and provided in a vehicle width direction. The shock absorber 1 of the present embodiment is mounted on both sides of the steering column and on a driver's seat side across the steering column. Since the space on both sides of the steering column is vertically long in relation to an installation space of other vehicle components (such as the meter 104, navigation device, and air conditioning equipment), the shock absorbers 1 are mounted to be adjacent to each knee 106 of the driver 101 in the vertically long space. Consequently, when the automobile 100 receives an impact, the knees 106 of the driver 101 come into contact with the shock absorbers 1, and the shock absorber 1 absorbs the impact and reduces the impact on the knees 106. Although FIG. 3 shows the shock absorber 1 (knee bolster) on the drivers seat side, a knee receiving member is mounted on a front passenger seat side at a position adjacent to the knees of an occupant in the front passenger seat, similar to the driver's seat side.

1. Configuration of Embodiment

Figure 1:
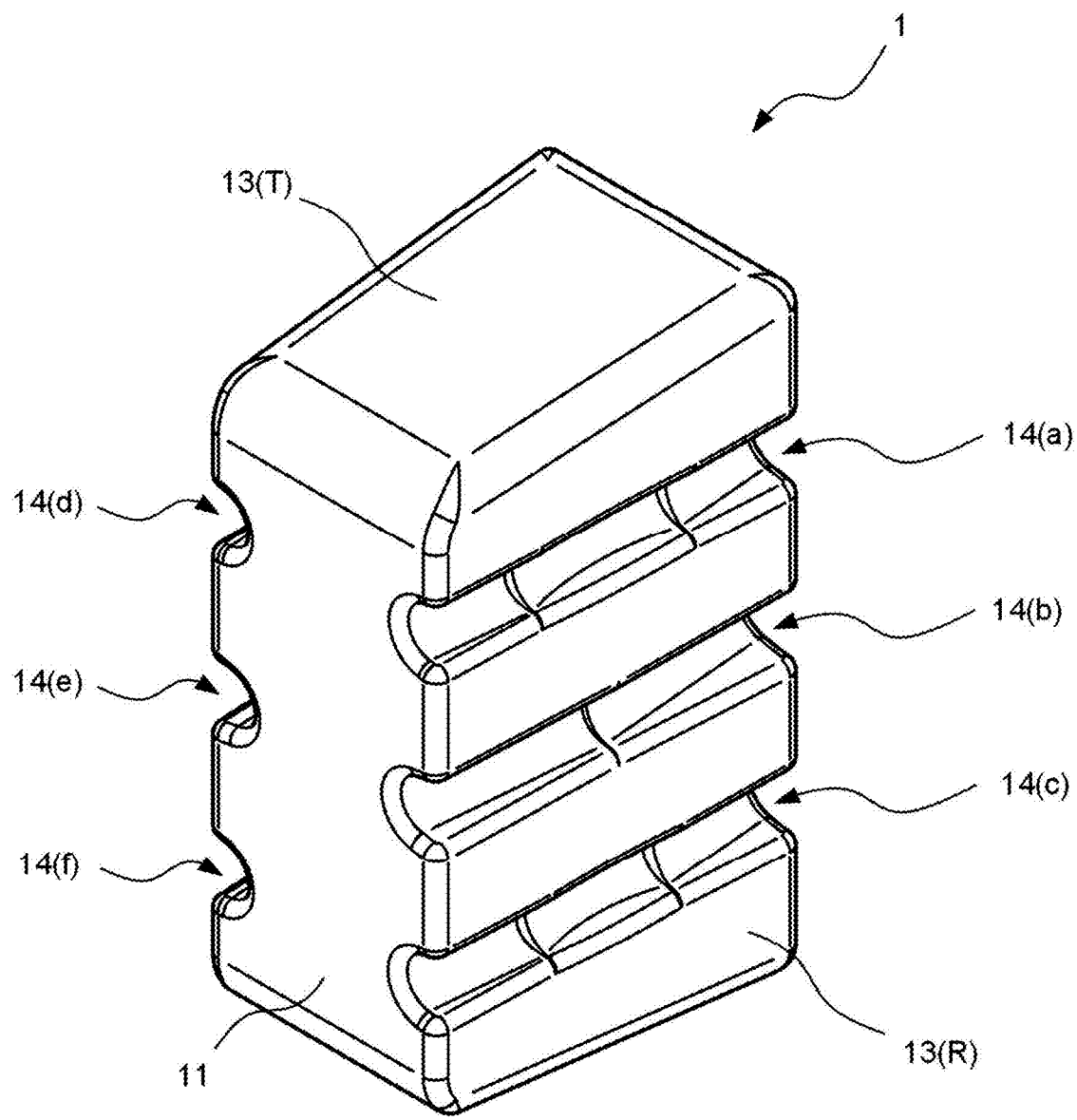
FIG. 1 is a perspective view of a shock absorber 1 according to an embodiment of the present invention.
Figure 4A:
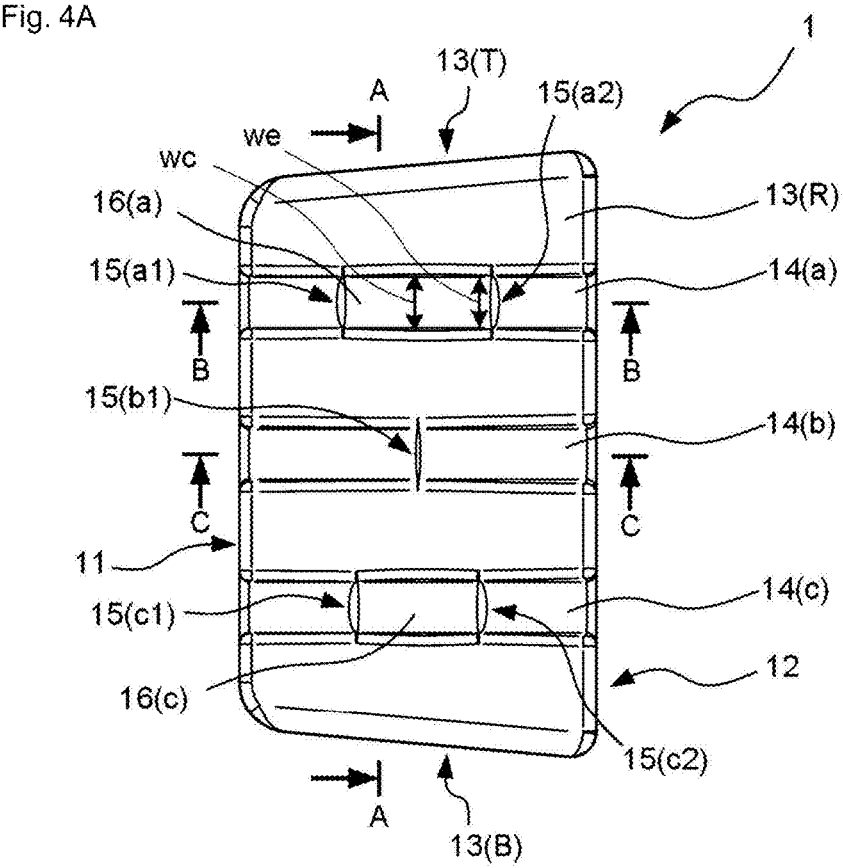
FIG. 4A is a side view of the shock absorber 1 according to the embodiment of the present invention.
Figure 4B:
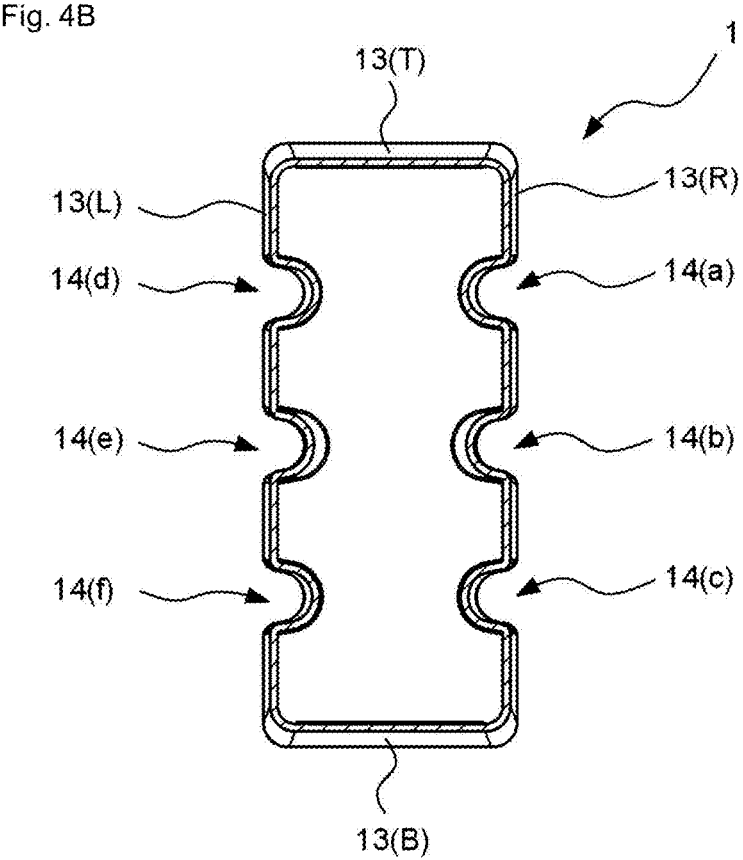
FIG. 4B is a cross-sectional view taken along A-A in FIG. 4A.
Figure 5A:
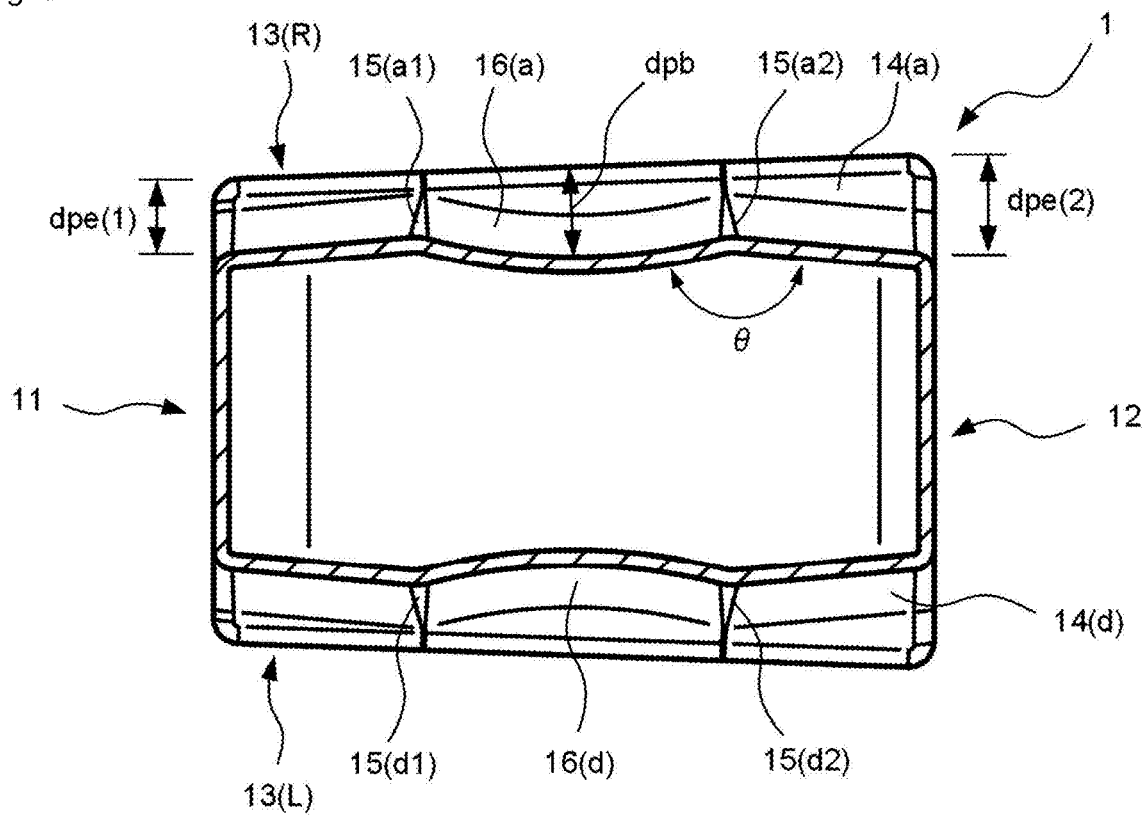
FIG. 5A is a cross-sectional view taken along B-B in FIG. 4A.
Figure 5B:
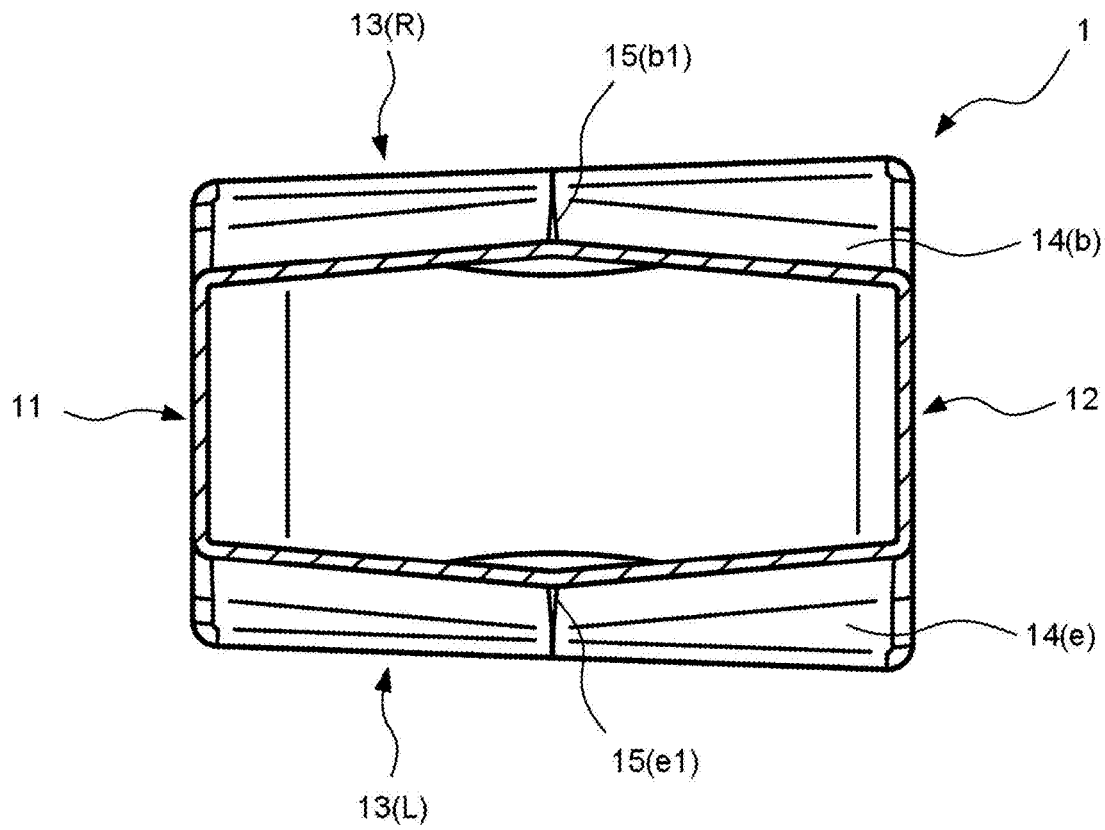
FIG. 5B is a cross-sectional view taken along C-C in FIG. 4A.

FIG. 1 is a perspective view of the shock absorber 1 according to the embodiment of the present invention. Further, FIG. 4A is a side view of the shock absorber 1, and FIG. 4B is a cross-sectional view taken along A-A in FIG. 4A. In addition, FIG. 5A is a cross-sectional view taken along B-B in FIG. 4A, and FIG. 5B is a cross-sectional view taken along C-C in FIG. 4A.

As shown in FIG. 1 and FIG. 4A, the shock absorber 1 includes a load input surface 11, a fixed surface 12 opposed to the load input surface 11, and a connection surface 13 connecting the load input surface 11 and the fixed surface 12. Here, the shock absorber 1 is a substantially hexahedron as a whole having rounded corners and sides, and the connection surface 13 includes four surfaces, that is, an upper connection surface 13(T), a lower connection surface 13(B), a right connection surface 13(R), and a left connection surface 13(L), though the number and shape of the connection surface 13 is not limited thereto. As is clear from the cross-sectional views of FIG. 4B, FIG. 5A, and FIG. 5B, the shock absorber 1 is a hollow molded body.

At least one of the right connection surface 13(R) and the left connection surface 13(L) includes a transverse groove rib 14. In the present embodiment, the right connection surface 13(R) includes three transverse groove ribs 14(*a*), 14(*b*), 14(*c*), and the left connection surface 13(L) includes three transverse groove ribs 14(*d*), 14(*e*), 14(*f*). The number of the transverse groove ribs 14 and the location of the connection surface 13 provided with the transverse groove rib 14 are not particularly limited. Further, although the longitudinal direction of all the transverse groove ribs 14 is substantially perpendicular to the load input surface 11 here, this angle is not limited particularly limited. In addition, the longitudinal directions of a plurality of transverse groove ribs 14 do not have to be parallel to each other.

The transverse groove rib 14 has a bending induction portion 15 which is convex toward the outside of the shock absorber 1. In FIG. 4A, the transverse groove rib 14(*a*) has bending induction portions 15(*a*1), 15(*a*2), the transverse groove rib 14(*b*) has a bending induction portion 15(*b*1), and the transverse groove rib 14(*c*) has bending induction portions 15(*c*1), 15(*c*2). The outward convex configuration is shown in FIG. 5A and FIG. 5B. FIG. 5A also shows bending induction portions 15(*d*1), 15(*d*2) provided on the transverse groove rib 14(*d*), and FIG. 5B also shows a bending induction portion 15(*e*1) provided on the transverse groove rib 14(*e*). In the present embodiment, the transverse groove rib 14(*f*) has the same shape as the transverse groove rib 14(*c*). The number of bending induction portions 15 provided on each transverse groove rib 14 is not particularly limited.

Figure 6:
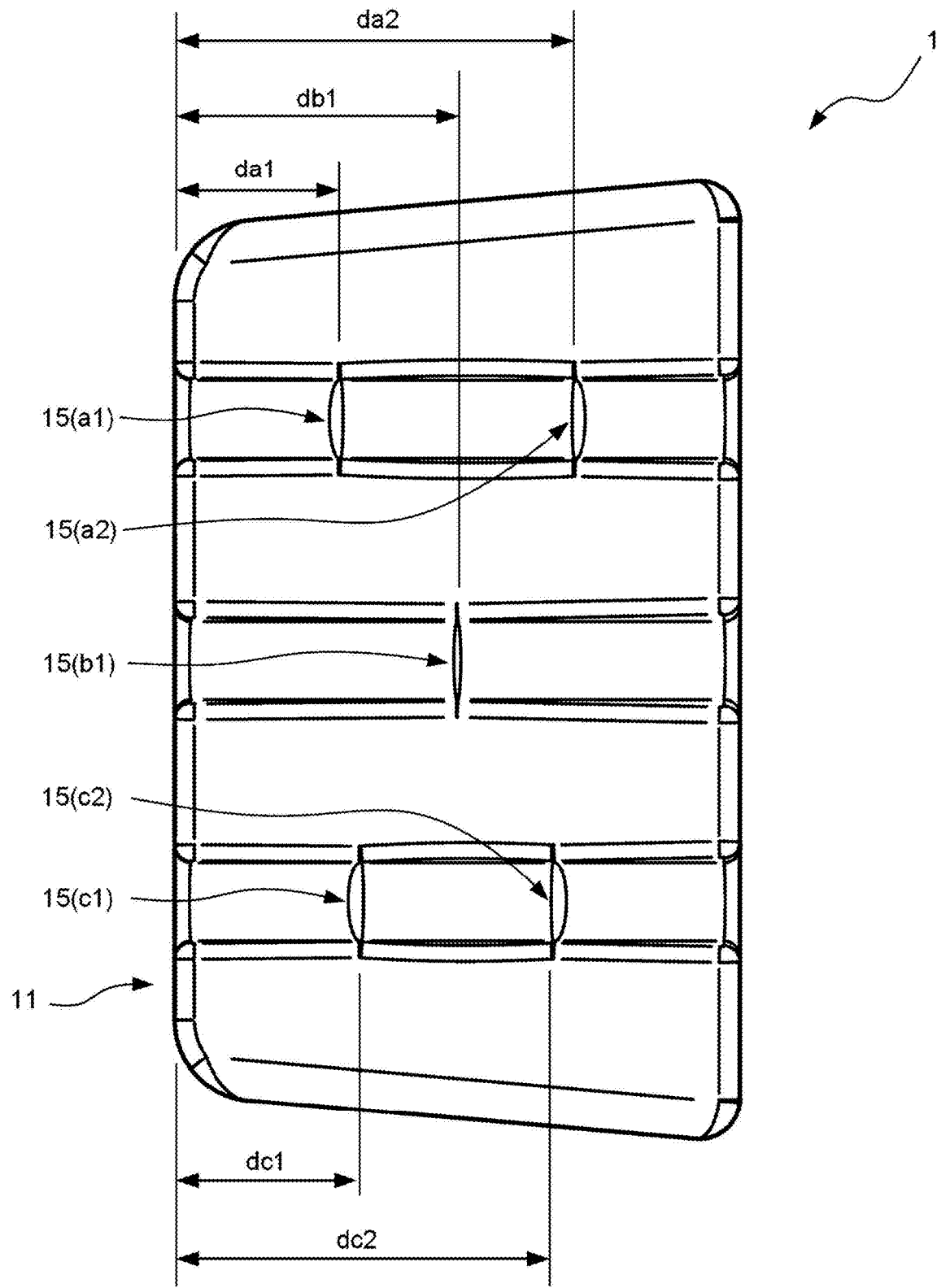
FIG. 6 shows a distance from a load input surface 11 to each of bending induction portions 15.

FIG. 6 shows a distance from the load input surface 11 to each of the bending induction portions 15. In the present embodiment, there are at least two bending induction portions 15 provided at positions where distances from the load input surface 11 are different from each other. If da1, da2, db1, dc1, dc2 represent a distance between the bending induction portions 15(*a*1), (*a*2), (*b*1), (*c*1), (*c*2) and the load input surface 11, respectively, then da1<dc1<db1<dc2<da2. The order of the distances does not have to be in this order and may be in any order. Further, it is not necessary that all of them are inequality signs, and some may be equal signs. That is, there may be a plurality of bending induction portions 15 at equal distances from the load input surface 11, as long as at least two of the bending induction portions 15 are located at different positions.

In other words, the shock absorber 1 of the present embodiment is a hollow molded body including the load input surface 11, the fixed surface 12 opposed to the load input surface 11, and the connection surface 13 connecting the load input surface and the fixed surface. The connection surface 13 has the transverse groove rib 14, and the transverse groove rib 14 includes the bending induction portion 15 which is convex toward the outside of the shock absorber 1. There are at least two bending induction portions 15 provided at positions where distances from the load input surface 11 are different from each other.

In this way, a plurality of bending induction portions 15 is provided at positions where distances from the load input surface 11 are different. Consequently, the timing at which the plastic deformation of each of the bending induction portions 15 due to the deformation of the shock absorber 1 starts can be shifted in multiple steps. Along with this, it is possible to reduce the load fluctuation of the shock absorber 1 as a whole after the start of plastic deformation.

Further, the shock absorber 1 is a hollow structure and has an advantage that it can be easily manufactured by blow molding.

When one transverse groove rib 14 is provided with a plurality of bending induction portions 15, the transverse groove rib 14 between adjacent bending induction portions 15 may be formed as a barrel-shaped portion 16. Here, the barrel-shaped portion 16 satisfies the following conditions (1) or (2).

(1) A width of a central portion of the barrel-shaped portion 16 is larger than a width of an end portion of the barrel-shaped portion 16.

(2) The barrel-shaped portion 16 is convex toward an inside of the shock absorber 1.

In FIG. 4A, the transverse groove rib 14(*a*) has the barrel-shaped portion 16(*a*) between the bending induction portion 15(*a*1) and the bending induction portion 15(*a*2), and the transverse groove rib 14(*c*) has the barrel-shaped portion 16(*c*) between the bending induction portion 15(*c*1) and the bending induction portion 15(*c*2).

Figure 7:
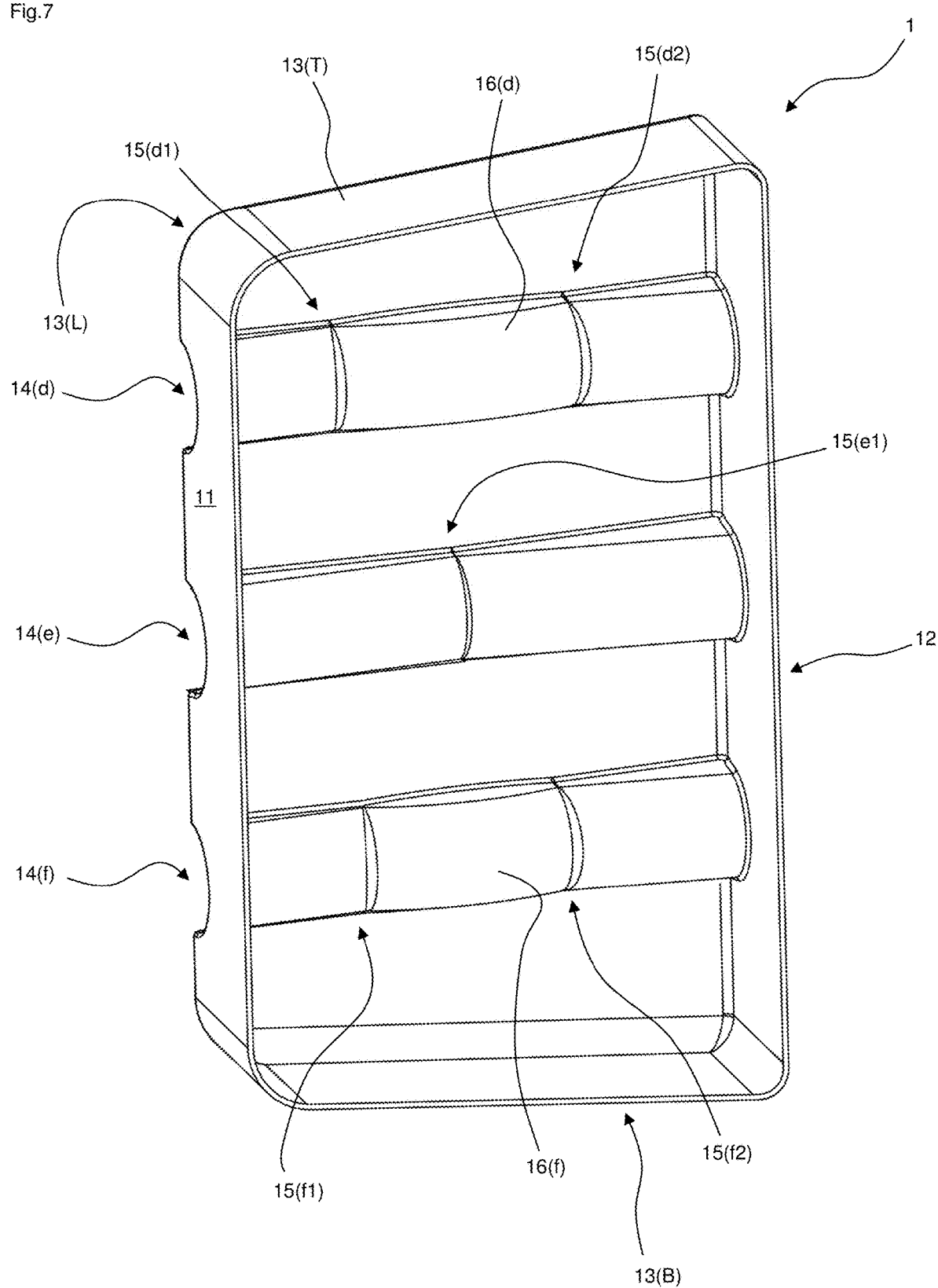
FIG. 7 is a diagram of the inside of a structure of the shock absorber 1 cut vertically, viewed from diagonally above.

The barrel-shaped portion 16(*a*) in FIG. 4 has the width wc at the central portion and the width we at the end portion, which satisfy wc>we, and thus the above-described condition (1) is satisfied. Further, FIG. 7 is a diagram of the inside of a structure of the shock absorber 1 cut vertically, viewed from diagonally above. As shown in FIG. 7, the left connection surface 13(L) (on a back side of FIG. 7) includes the transverse groove ribs 14(*d*), 14(*e*), 14(*f*). The transverse groove rib 14(*d*) includes the bending induction portions 15(*d*1), 15(*d*2) and the barrel-shaped portion 16(*d*). The transverse groove rib 14(*e*) includes the bending induction portion 15(*e*1). The transverse groove rib 14(*f*) includes the bending induction portions 15(*f*1), 15(*f*2) and the barrel-shaped portion 16(*f*). The barrel-shaped portions 16(*d*), 16(*f*) are convex toward the inside of the shock absorber 1 and thus satisfy the above-described condition (2).

It is possible to adjust the rigidity of the entire shock absorber 1 by varying the amount of change in width of the barrel-shaped portion 16 and changing the degree of convexity toward the inside of the shock absorber 1.

Figure 2:
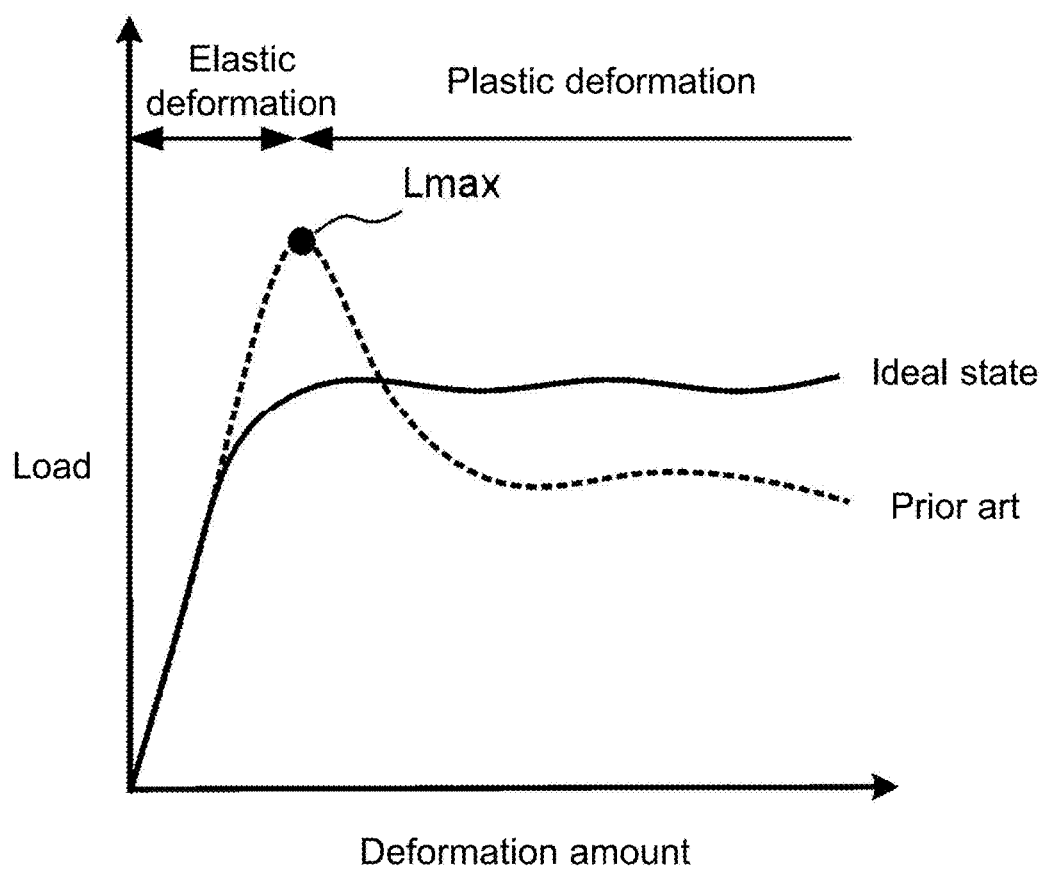
FIG. 2 shows a relationship between the load and the amount of deformation of a shock absorber.

As described above, in the present embodiment, there are at least two bending induction portions 15 provided at positions where distances from the load input surface 11 are different from each other. By setting these distances dispersed over as wide a range as possible, it is possible to lengthen a flat part of the load-deformation curve shown in FIG. 2. Specifically, it is preferable to satisfy the condition of dmax/dmin>1.5, where dmin (da1 in FIG. 6) represents a distance between the load input surface 11 and the bending induction portion 15 closest to this load input surface 11, and dmax (da2 in FIG. 6) represents a distance between the load input surface 11 and the bending induction portion 15 farthest from the load input surface 11.

Further, the degree of freedom in designing the shock absorber 1 as a whole can be increased by reducing the influence of the bending induction portion 15 of one transverse groove rib 14 which has started the plastic deformation on the influence of the bending induction portion 15 of another adjacent transverse groove rib 14. For this purpose, regarding the bending induction portion 15, it is preferable to arrange all the bending induction portions 15 provided on adjacent transverse groove ribs 14 are arranged such that distances from the load input surface 11 are different from each other.

In order to arrange the bending induction portions 15 in different positions for each of the adjacent transverse groove ribs 14, adjacent transverse groove ribs 14 preferably have a different number of bending induction portions 15 from each other. For example, as shown in FIG. 4A, the transverse groove rib 14(*a*) has two bending induction portions including the bending induction portion 15(*a*1) and the bending induction portion 15(*a*2), and the transverse groove rib 14(*b*) has one bending induction portion 15(*b*1). With such a configuration, as shown in FIG. 6, it is possible to increase the difference between the distances da1, da2 and the distance db1, which are distances between the load input surface 11 and the bending induction portions 15(*a*1), 15(*a*2), 15(*b*1).

The local elastic limit at which each of the bending induction portions 15 starts plastic deformation depends not only on the material and thickness of the bending induction portions 15 but also on the degree of convexity toward the outside of the shock absorber 1, that is, an internal angle θ (see FIG. 5A) of the apex of the bending induction portion. This internal angle θ needs to be less than 180° to effectively induce bending and is preferably 90° or more because an extremely sharp angle will lead to reduced elastic limit. In other words, it is preferable to satisfy 90°≤θ<180° where θ represents the internal angle of the apex of the bending induction portion 15. Specifically, θ is, for example, 90, 100, 110, 120, 130, 140, 150, 155, 160, 165, 170, 175, 179° and may be within a range between any two of the values exemplified herein.

Although a plurality of bending induction portions 15 is plastically deformed in multiple steps in the present embodiment, unnecessarily increasing the number of design parameters will result in a time-consuming design and evaluation. Therefore, preferably, the thickness of the material forming the shock absorber 1 as a hollow molded body does not vary greatly from place to place. That is, it is preferable to reduce the degree of unevenness (concavity and convexity) on each of the connection surfaces 13 when manufacturing the shock absorber 1 by a manufacturing method, such as blow molding. For example, in FIG. 5A, depths dpe(1) and dpe(2) at the end portions of the transverse groove rib 14 are preferably set closer to a maximal value dpb of the depth of the barrel-shaped portion 16. Specifically, it is preferable to satisfy the condition of 0.7≤dpe/dpb≤1.5 where dpe represents the depth of the transverse groove rib 14 at its end portion, and dpb represents a maximal value of the depth of the barrel-shaped portion. It is preferable to satisfy the condition of 0.8≤dpe/dpb≤1.3 and more preferable to satisfy the condition of 0.9≤dpe/dpb≤1.1. Specifically, dpe/dpb is, for example, 0.7, 0.8, 0.9, 1, 1.1, 1.2, 1.3, 1.4, 1.5 and may be within a range between any two of the values exemplified herein.

2. Conclusion

As described above, according to the present embodiment, it is possible to provide a shock absorber capable of suppressing load fluctuation after the start of plastic deformation.

The shock absorber 1 is the shock absorber 1 formed of a hollow molded body including the load input surface 11, the fixed surface 12 opposed to the load input surface 11, and the connection surface 13 connecting the load input surface 11 and the fixed surface 12. The connection surface 13 has the transverse groove rib 14, and the transverse groove rib 14 includes the bending induction portion 15 which is convex toward the outside of the shock absorber 1. There are at least two bending induction portions 15 provided at positions where distances from the load input surface 11 are different from each other.

Although the embodiment according to the present invention has been described, these are presented as examples and are not intended to limit the scope of the invention. The novel embodiments can be implemented in various other forms, and various omissions, replacements, and changes can be made without departing from the spirit of the invention. The embodiments and the modifications thereof are included in the scope and gist of the invention and are included in the invention described in the claims and the equivalents thereof.

REFERENCE SIGNS LIST

1: shock absorber
11: load input surface
12: fixed surface
13: connection surface
14: transverse groove rib
15: bending induction portion
16: barrel-shaped portion
100: automobile
101: driver
102: front seat
103: passenger compartment
104: meter
105: steering wheel
106: knee
θ: internal angle

The invention claimed is:

1. A shock absorber formed of a hollow molded body, comprising:
   a load input surface;
   a fixed surface opposed to the load input surface; and
   a connection surface connecting the load input surface and the fixed surface, wherein the connection surface comprises at least one transverse groove rib, the at least one transverse groove rib comprises a barrel-shaped portion and at least two bending induction portions provided at positions where distances from the load input surface are different from each other, the at least two bending induction portions each being convex toward an outside of the shock absorber, and a width of a central portion of the barrel-shaped portion is larger than a width of both end portions of the barrel-shaped portion.

2. The shock absorber of claim 1, wherein the barrel-shaped portion is located between the bending induction portions.

3. The shock absorber of claim 1, which satisfies a condition of: dmax/dmin>1.5, wherein dmin represents a distance between the load input surface and the bending induction portion closest to the load input surface, and dmax represents a distance between the load input surface and the bending induction portion farthest from the load input surface.

4. The shock absorber of claim 1, wherein the at least one transverse groove rib comprises a plurality of transverse groove ribs, and all the bending induction portions provided on adjacent transverse groove ribs are arranged such that distances from the load input surface are different from each other.

5. The shock absorber of claim 1, wherein the at least one transverse groove rib comprises a plurality of transverse groove ribs, and adjacent transverse groove ribs have a different number of bending induction portions from each other.

6. The shock absorber of claim 1, which satisfies a condition of: $90° \leq \theta < 180°$, wherein $\theta$ represents an internal angle of an apex of each of the at least two bending induction portions-portion.

7. The shock absorber of claim 1, which satisfies a condition of:
$0.7 \leq dpe/dpb \leq 1.5$, wherein dpe represents a depth at an end portion of the at least one transverse groove rib, and dpb represents a maximal value of a depth of the barrel-shaped portion.

* * * * *